United States Patent
Nozaki

(10) Patent No.: US 8,087,264 B2
(45) Date of Patent: Jan. 3, 2012

(54) GLASS FORMING APPARATUS AND METHOD

(75) Inventor: Moriji Nozaki, Sagamihara (JP)

(73) Assignee: Ohara Inc., Kanagawa (JP)

( * ) Notice: Subject to any disclaimer, the term of this patent is extended or adjusted under 35 U.S.C. 154(b) by 60 days.

(21) Appl. No.: 11/545,447

(22) Filed: Oct. 11, 2006

(65) Prior Publication Data
US 2007/0084246 A1    Apr. 19, 2007

(30) Foreign Application Priority Data
Oct. 14, 2005   (JP) .................... 2005-300765

(51) Int. Cl.
*C03B 11/12*      (2006.01)
(52) U.S. Cl. ................. 65/319; 65/103; 65/356
(58) Field of Classification Search ......... 65/319, 65/103, 66, 83, 85, 102, 286, 355, 356; 264/1.1–2.7, 264/239, 327
See application file for complete search history.

(56) References Cited

U.S. PATENT DOCUMENTS

| | | | | |
|---|---|---|---|---|
| 3,078,696 A | * | 2/1963 | Torok | 65/356 |
| 3,468,654 A | * | 9/1969 | Torok | 65/162 |
| 4,140,512 A | * | 2/1979 | Carmi et al. | 65/319 |
| 4,191,039 A | * | 3/1980 | Bradbury | 72/60 |
| 4,632,686 A | * | 12/1986 | Brown et al. | 65/17.3 |
| 5,032,159 A | * | 7/1991 | Kuwabara et al. | 65/64 |
| 5,215,566 A | * | 6/1993 | Yamamoto et al. | 65/29.12 |
| 5,632,794 A | * | 5/1997 | Chang et al. | 65/83 |

FOREIGN PATENT DOCUMENTS

| | | |
|---|---|---|
| JP | 04-021528 H | 1/1992 |
| JP | 05-043259 A | 2/1993 |
| JP | 05-193962 H | 8/1993 |
| JP | 09-110442 H | 4/1997 |
| JP | 10-212127 | 8/1998 |
| JP | 11-001329 | 1/1999 |
| JP | 11-228152 | 8/1999 |
| JP | 2003-112927 | 4/2003 |
| WO | WO 2005115653 A1 * | 12/2005 |

* cited by examiner

*Primary Examiner* — Matthew Daniels
*Assistant Examiner* — Cynthia Szewczyk
(74) *Attorney, Agent, or Firm* — Hoffmann & Baron, LLP

(57) ABSTRACT

A glass forming apparatus and a glass forming method are provided, which are capable of retaining the whole press surface at favorable temperatures for pressing glass, and forming a high-quality, efficient glass form. An upper die having a part formed such that the wall thickness of a bottom part, provided as an example of an opposite press surface, decreases gradually from the outside to the inside and the bottom part is formed as a part of the inner wall. In other words, the heat exchange chamber is in approximately a circular truncated cone shape.

12 Claims, 5 Drawing Sheets

GLASS FORMING APPARATUS AND METHOD

This application is based on and claims the benefit of priority from Japanese Patent Application No. 2005-300765, filed on 14th Oct. 2005, the content of which is incorporated herein by reference.

BACKGROUND OF THE INVENTION

The present invention relates to a glass forming apparatus and a glass forming method, and in particular, relates to an apparatus and method for forming a glass substrate or a crystallized glass substrate, which can be used for preparing a disk for an information storage medium.

Related Art

An optical device, such as a lens, a glass substrate for a disk of an information storage medium, or the like is generally produced so that a glass mass (molten glass) can be pressed into shape by any of methods including a direct press method and a repeated press method.

The direct press method presses a glass mass into a predetermined shape using a die (which is a forming die having an upper die part and a lower die part) after lowering a predetermined-weight molten glass to a forming-temperature range. In contrast, the repeated press method reheats a predetermined-weight glass mass obtained by cooling and solidifying molten glass to increase in temperature to a forming-temperature range, followed by pressing the glass mass into shape using a die.

In the process of obtaining a glass form, such as a lens and a glass substrate for a disk of an information storage medium, by pressing a glass mass into shape using a forming die by the above press-forming method, heat is supplied from molten glass to the forming die. The heated forming die increases its temperature, so that any apparatus for cooling the forming die can be required when glass forms are serially produced. If the glass form is produced without cooling the forming die, the glass form may stick to the forming die and thus the resulting product may be anything but a desired one because of a remarkable decrease in surface precision of the glass form. Therefore, as described in Japanese Unexamined Patent Application Publication No. Hei 10-212127, a glass forming apparatus, which is capable of cooling a forming die, has been provided in the art.

The conventional glass forming apparatus has a heat exchange chamber in an upper die part. In the heat exchange chamber, a fluid for heat exchanging fluid (e.g., air containing water particles) flows and circulates to cool the press surface of the die by absorbing heat around that surface.

When the conventional glass-forming apparatus is used, molten glass mounted on the center of the press surface of a lower die is drawn to the end of the press surface as the molten glass is pressed (pressurized) by the pressure surface. In this case, the heat conducted from the molten glass through to the upper die through the press surface is absorbed by the heat exchange fluid through the upper die, thereby allowing the press surface to be cooled down, as well as a decrease in temperature of a molten glass. Therefore, the center of the press surface to be brought into contact with the molten glass at first reaches to the highest temperature. The nearer the end of the press surface, the lower the temperature of the press surface, compared with that of the center thereof.

However, the bottom of the heat exchange chamber is formed in parallel to the press surface, so that the whole press surface can be uniformly cooled. In other words, both the center of the press surface being most in need of cooling and the peripheral end thereof being less in need of cooling than the center are uniformly cooled. Therefore, the whole press surface is retained at unfavorable temperatures for pressing molten glass, so that the molten glass can thus extend insufficiently. As a result, the molten glass can be solidified before extending to the peripheral end of the press surface. In this case, furthermore, the molten glass takes much time to extend to the peripheral end, so that the efficiency of glass-forming process may be unfavorable.

When desiring to form biconvex and biconcave lenses, (heat exchange chamber having a shape of a conventional glass forming apparatus for forming biconcave and biconvex lenses) the shape of the heat exchange chamber differs from the abovementioned heat exchange chamber, in which the bottom part and press surface are parallel to each other. Furthermore, even in cases such as this, in which the bottom part of the heat exchange chamber simply has a flat surface, a high-quality desirable glass form cannot be formed efficiently because the degree of heat absorption for each part of the press surface is insufficient, and the temperature distribution of the entire press surface is not the desired temperature distribution for pressing molten glass.

Furthermore, in contrast to the above glass forming apparatus in which the heat exchange chamber functions to cool the press surface, a glass forming apparatus, which performs pressing after softening glass gob mounted on the press surface of a lower die, is provided with a heat exchange chamber for circulating a high-temperature fluid. The heat exchange chamber may be formed in an upper die (or at least one of the upper and lower dies). In this case, just as in the above case, as far as the bottom surface of the upper die (or the upper surface of the lower die) is formed in parallel with the press surface of the upper die (or the press surface of the lower die), a high-quality, desirable glass form cannot be formed efficiently because the whole press surface is not retained at temperatures favorable for pressing the molten glass.

The present invention has been completed in consideration of the above problems. An object of the present invention is to provide a glass forming apparatus, which is capable of efficiently forming a high-quality glass form such that the whole press surface is retained at temperatures preferable for pressing glass. Another object of the present invention is to provide a method for forming a glass form using the novel glass forming apparatus.

SUMMARY OF THE INVENTION

Specifically, the present invention can be provided as follows:

In a first aspect of the present invention, a glass forming apparatus comprises a die having a press surface for pressing glass, wherein the die is constructed such that the wall thickness of an opposite press surface decreases gradually or stepwisely from the outside to the inner side thereof.

According to the first aspect of the invention, as the die is constructed such that the wall thickness of the solid press surface decreases gradually or stepwisely from the outside to the inner side thereof, for example, when the opposite press surface absorbs heat transmitted from the press surface for pressing glass generally on the center of the press surface and the absorbed heat is heat-exchanged with the outside, the center of the opposite press surface, where most of heat is desired to be absorbed, is allowed to absorb the most of heat. On the other hand, the end of the opposite press surface, where the heat is absorbed insufficiently compared with that of the center of the press surface. Therefore, the whole press surface is retained at favorable temperatures for pressing glass, so that a high-quality, efficient glass form can be formed. In the case of a convex lens, even though there is a conventional example formed such that the die becomes thinner from the outside to the inside depending on the shape of a press surface, the present invention causes variations in wall thickness of a die depending on the shape of at least an opposite press surface, thereby being clearly distinguished from the conventional one.

Here, as shown in FIG. 1, with respect to a die 1 having a press surface 2 for pressing glass "a", the term "opposite press surface" refers to a surface 3 opposite to the press surface 2 in the direction toward the glass "a".

In a second aspect of a glass forming apparatus as described in a first aspect of the present invention, the die forms a heat exchange chamber where the opposite press surface is provided as a part of an inner wall of the heat exchange chamber; and the inside of the heat exchange chamber is able to circulate a heat-exchanging fluid for making a heat exchange with a surrounding part thereof.

According to the second aspect of the present invention, the die is constructed such that the wall thickness of the solid press surface decreases gradually or stepwisely from the outside to the inner side thereof and the heat exchange chamber for circulating the heat-exchanging fluid is formed while the part of the inner wall of the heat exchange chamber is provided as the opposite press surface. Thus, for example, if the opposite press surface absorbs heat transmitted from the press surface for pressing glass generally mounted on the center of the press surface to take the heat from the press surface, the heat is mostly absorbed in the heat-exchanging fluid at the center of the opposite press surface being most in need of heat absorption. In contrast, the heat is moderately absorbed in the heat-exchanging fluid on the end of the opposite press surface being less in need of heat absorption than the center.

In addition, for example, in the case of a glass forming apparatus for carrying out press forming after softening solidified glass (e.g., glass gob), a heat exchange chamber may circulate a high-temperature fluid. In this case, however, heat is mostly supplied from the heat exchange chamber to the center of the opposite press surface most in need of heat supply from the heat exchange chamber, while heat is moderately supplied from the heat-exchanging fluid to the end of the opposite press surface less in need of heat supply than the center of the opposite press surface.

In view of the above, according to the second aspect of the present invention, the whole press surface is heated at a more preferable temperature for pressing glass, thereby allowing the formation of a high-quality, efficient glass form.

Furthermore, as described above, with respect to a die having a press surface for pressing glass, the opposite press surface is a surface opposite to the press surface in the direction toward the glass. In particular, as shown in FIG. 2, in the case of forming a heat exchange chamber 5 in a die 4 having a press surface 2 for pressing glass "b", the opposite press surface is a surface 7 (i.e., a discontinuous surface, conveniently represented by the thick line), which is arranged opposite to the press surfaced 6 in the direction toward glass b and can be first stretched out into space from the die 4.

In a third aspect of a glass forming apparatus as described in the second aspect of the present invention, the heat exchange chamber is in approximately a circular truncated cone shape or approximately a cone shape.

In a fourth aspect of a glass forming apparatus as described in the second aspect of the present invention, the die comprises a tube for introducing a heat-exchanging fluid, which introduces the heat-exchanging fluid into the heat exchange chamber, and the tube for introducing the heat-exchanging fluid has a terminal end portion that extends up to the vicinity of the center of the opposite press surface of the heat exchange chamber.

According to the fourth aspect of the present invention, there is provided a tube for introducing a heat-exchanging fluid, which introduces the heat-exchanging fluid into the heat exchange chamber, and the tube for introducing the heat-exchanging fluid has a terminal end portion that extends up to the vicinity of the center of the opposite press surface of the heat exchange chamber. Therefore, for example, when the opposite press surface absorbs heat transmitted from the press surface for pressing glass to take the heat from the press surface, for example, the heat-exchanging fluid is discharged in the vicinity of the center of the opposite press surface most in need of heat absorption. Thus, the heat absorption can be further facilitated in the vicinity of the center of the opposite press surface. On the other hand, on the end of the opposite press surface being less in need of heat absorption than the center, the heat-exchanging fluid, which has been once subjected to heat absorption (heat exchange), is circulated, so that the heat can be moderately absorbed.

Furthermore, for example, in the case of a glass forming apparatus that carries out press forming after softening solidified glass (e.g., glass gob), a high-temperature fluid is circulated by the heat exchange chamber. In this case, the heat-exchanging fluid can be discharged in the vicinity of the center of the opposite press surface, which is most in need of heat supplied from the heat exchange chamber. Therefore, the supply of heat can be further facilitated in the vicinity of the center of the opposite press surface. In contrast, on the end of the opposite press surface, which is less in need of the supply of heat than that in the vicinity of the center of the opposite press surface, the heat-exchanging fluid, which has been once subjected to heat supply (heat exchange), is circulated, thereby the heat to be moderately supplied.

In view of the above, according to the fourth aspect of the present invention, the whole press surface can be heated at a more preferable temperature for pressing glass, so that a higher-quality, efficient glass form can be formed.

In a fifth aspect of a glass forming apparatus as described in the fourth aspect of the present invention, a ratio of the diameter of the tube for introducing the heat-exchanging fluid to the outermost diameter of the heat exchange chamber is in the range of 1:20 to 15:20.

In a sixth aspect of a glass forming apparatus as described in the second aspect of the present invention, comprises a feeding device for feeding the heat-exchanging fluid to the heat exchange chamber, a distribution-control device for controlling the feeding device, and a temperature-measuring sensor for measuring a temperature at a surrounding part of the press surface, wherein the amount of the heat-exchanging fluid feed to the heat exchange chamber is controlled depending on the temperature of the surrounding part of the press surface measured by the temperature-measuring sensor.

In a seventh aspect of a glass forming apparatus as described in the second aspect of the present invention, the die comprises a discharge tube for discharging the heat-exchanging fluid from the heat exchange chamber to the outside; and the discharge tube for heat-exchanging fluid is provided for communicating with an uppermost part in the direction of antigravity with respect to the heat exchange chamber.

According to the seventh aspect of the present invention, the discharge tube for the heat-exchanging fluid is communicated with the uppermost part in the direction of antigravity with respect to the heat exchange chamber, so that the heat exchange chamber can be prevented from air-trapping. Therefore, the heat-exchanging fluid, which has been heat-exchanged, is smoothly discharged to the outside, so that the whole press surface can be heated at a more preferable temperature for pressing glass, thereby allowing the formation of a high-quality, efficient glass form.

In an eighth aspect of a glass forming apparatus as descried in the second aspect of the present invention, the heat-exchanging fluid is water.

According to the eighth aspect of the present invention, the die is constructed such that the wall thickness of the opposite press surface decreases gradually or stepwisely from the outside to the inside. In addition, the heat exchange chamber is formed in the die to circulate water. For example, when the opposite press surface absorbs heat transmitted from the press surface for pressing glass, which can be generally mounted on the center of the press surface, to take the heat from the press surface, the heat can be mostly absorbed in water at the center of the opposite press surface being most in need of heat absorption. In contrast, on the end of the opposite press surface, which is less in need of the supply of heat than that in the vicinity of the center of the opposite press surface, heat can be moderately absorbed by water. Therefore, the whole press surface can be heated at a more preferable temperature for pressing glass, thereby allowing the formation of a high-quality, efficient glass form.

In a ninth aspect of a glass forming apparatus as described in the first aspect of the present invention, the die comprises a flat part on the press surface.

In a tenth aspect of a method for forming glass uses a glass forming apparatus of the first aspect of the present invention.

According to the present invention, the die is constructed such that the wall thickness of an opposite press surface decreases gradually or stepwisely from the outside to the inner side thereof. For example, when the opposite press surface absorbs heat transmitted from the press surface for pressing glass, which can be generally mounted on the center of the press surface, to take the heat from the press surface by heat exchange of the absorbed heat with the outside, the heat can be mostly absorbed at the center of the opposite press surface being most in need of heat absorption, while the heat can be moderately absorbed at the end of the opposite press surface being less in need of heat absorption than the center. Therefore, the whole press surface is retained at favorable temperatures for pressing glass, so that a high-quality, efficient glass form can be formed.

DETAILED DESCRIPTION OF THE INVENTION

Figure 1:
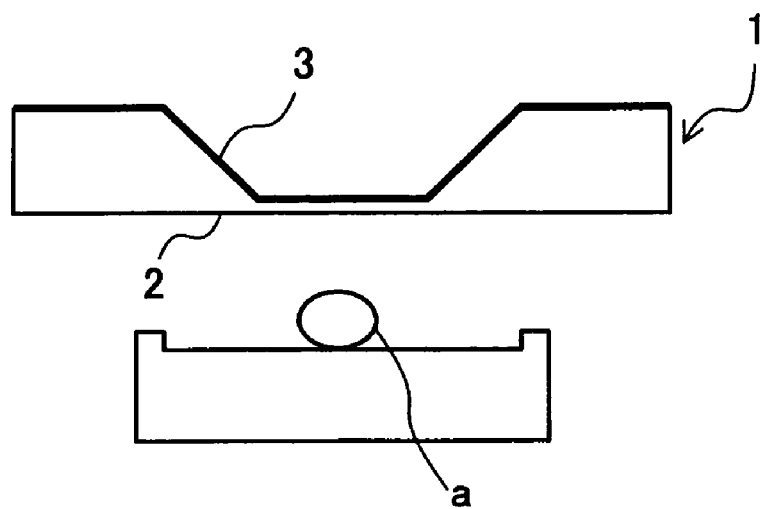
FIG. 1 is a cross sectional schematic view of a glass forming apparatus of the present invention.
Figure 2:
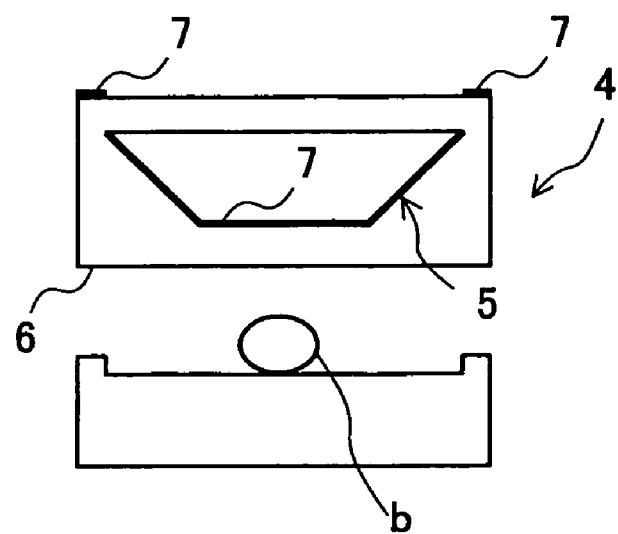
FIG. 2 is a cross sectional schematic view of the glass forming apparatus of the present invention.

Hereinafter, embodiments of the glass forming apparatus of the present invention and embodiments of a method for forming glass, which can be carried out using such a glass forming apparatus, of the present invention will be described, respectively. For describing the following embodiments, the corresponding structural elements will be given the same reference numerals and the descriptions thereof will be omitted or simplified.

Glass Manufacturing Device

Figure 3:
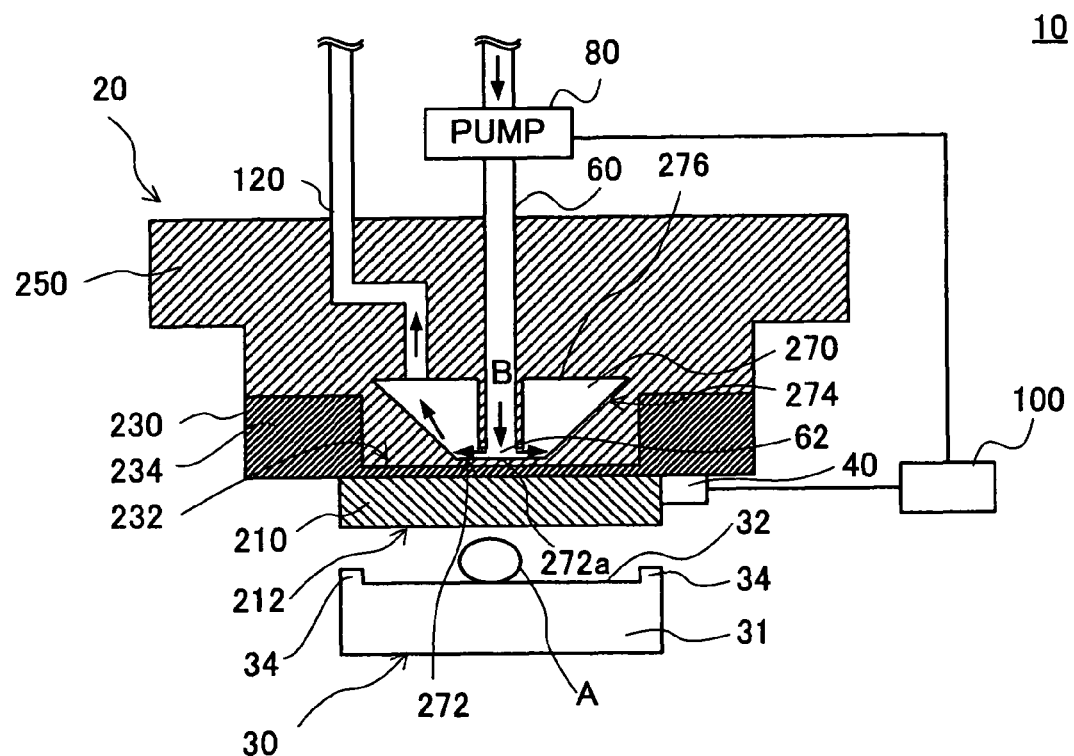
FIG. 3 is a partial cross sectional front view of the schematic configuration of the glass forming apparatus in accordance with a first embodiment of the present invention.
Figure 4:
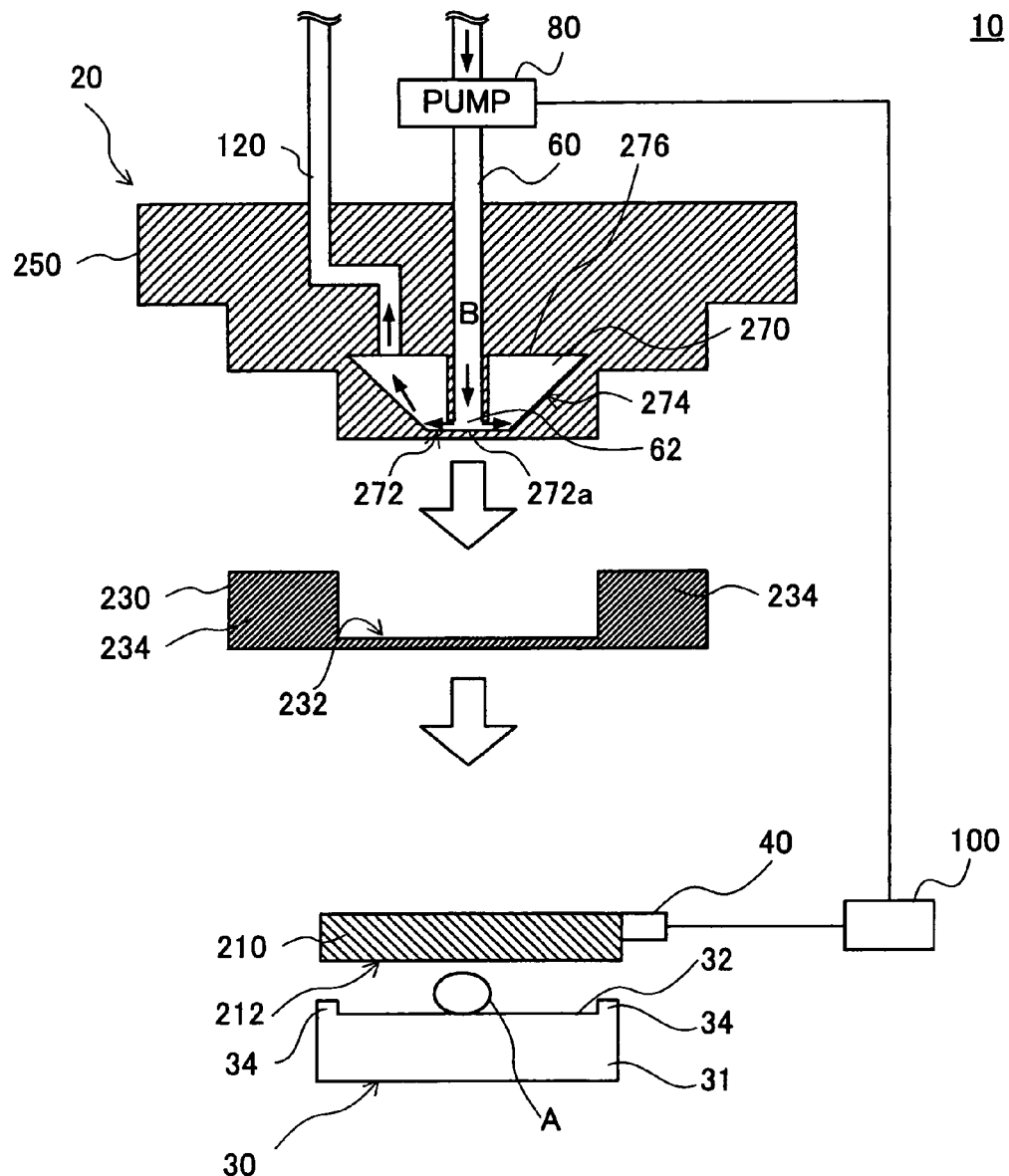
FIG. 4 is an exploded view of the schematic configuration of the glass forming apparatus in accordance with the first embodiment of the present invention.

FIG. 3 is a partial cross sectional front view of the schematic configuration of a glass forming apparatus in accordance with a first embodiment of the present invention. FIG. 4 is an exploded view of the schematic configuration of the glass forming apparatus in accordance with the first embodiment of the present invention.

As shown in FIG. 3, a glass forming apparatus 10 comprises: a lower die 30 on which molten glass A is mounted; an upper die 20 being arranged opposite to the lower die 30, which is provided for pressing (pressurizing) the molten glass A; a temperature sensor 40 for measuring the temperature of the upper die 20; a tube 60 for introducing a heat-exchanging fluid B for cooling (heat-exchanging) the upper die 20 into the upper die 20; a pump 80 for feeding the heat-exchanging fluid B into the upper die 20; a control circuit for controlling the pump 80; and a tube 120 for discharging the heat-exchanging fluid B from the upper die 20 to the outside.

In the present embodiment, the upper die 20 is designed so that it can move up and down by a driving device not shown in the drawing. As far as the lower die 30 can be driven, alternatively, the upper die 20 may be of being fixed.

Furthermore, the upper die 20 comprises a first die 210, which is responsible for pressing molten glass A described below; a second upper die 230 arranged on and in close contact with the first upper die 210, which is provided as a spacer; and a third upper die 250 arranged on and in close contact with the second upper die 230, in which a heat exchanger 270 is formed. Furthermore, the first upper die 210, the second upper die 230, and the third upper die 250 are fixed together by means of screws (not shown). The first upper die 210, the second upper die 230, and the third upper die 250 may be adhered to each other. Alternatively, the first upper die 210, the second upper die 230, and the third upper die 250 may be integrally formed.

The first upper die 210 is formed in a cylindrical shape and extrudes from the second upper die 230. The first upper die 210 has a press surface 212 on its lower part to press molten glass A together with the lower die 30 (with a press surface 32). Here, the glass forming apparatus 10 is provided for forming a glass substrate of a magnetic disk, so that the press surface 212 has a flat part.

The second upper die 230 is in the shape of a cylindrical form in which a cylindrical concave in the center part thereof. The second upper die 230 comprises a disk-shaped part 232 in the shape of a disk form being in close contact with the first upper die 210, and a protruded part 234 formed such that it protrudes from the end of the disk-shaped part. The second upper die 230 is coaxially formed with the first upper die 210 and the third upper die 250. Furthermore, the second upper die 230 is provided between the first upper die 210 and the third upper die 250. In other words, the second upper die 230 is provided as a spacer between the first upper die 210 and the third upper die 250. Furthermore, when molten glass A is press-formed to a predetermined form by the press surface 210 of the third upper die 250, heat is transmitted from the molten glass A to the first upper die 210 via the press surface 212 and then from the first upper die 210 to the second upper die 230. Therefore, the second upper die 230 acts as a heat buffer.

The third upper die 250 is formed into a cylindrical shape such that it is tapered with three stages. A cylindrical part having a smallest diameter and being located on the lower side of the third upper die 250 fits into the second upper die 230. The third upper die 250 has a cavity in the lower part of the center thereof. The cavity is provided as a heat exchange chamber 270, which can circulate a heat-exchanging fluid B for carrying out heat exchange with its surrounding part. The heat exchange chamber 270 is constructed such that it is sequentially tapered from the upper part of the upper die 20 to an approximate central part 272a of a bottom part 272 formed in parallel with the press surface 212. In other words, the heat exchange chamber 270 comprises the bottom part 272, a slant part 274 extending in the inclined upper direction from the bottom part 272 and the end of the bottom 272 to be formed in parallel with the press surface 212, and a ceiling part 276, which is an uppermost part directing in the direction of an antigravity. In other words, furthermore, the heat exchange chamber 270 may be formed into approximately a cone shape, instead of a circular truncated cone the form.

Consequently, the upper die 20 (the heat chamber 270 of the third upper die 250) comprises a part being constructed such that the wall thickness of a bottom part 272, an example of the opposite surface, may decrease gradually from the outside to the inside thereof. The bottom part 272 is formed as a part of the inner wall.

As configured as described above, when the press surface 212 is cooed such that the bottom part 272 absorbs heat transmitted from the press surface 212 for pressing molten glass to be generally mounted on the central part of the press surface 32, the center part of the bottom part 272 most in need of heat absorption, a heat-exchanging fluid mostly absorbs heat at the center part of the bottom part 272. In contrast, on the end of the opposite press surface being less in need of heat absorption than the center of the bottom part 272, the heat-exchanging fluid moderately absorb the heat.

Therefore, the whole press surface is retained at favorable temperatures for pressing glass, so that a high-quality, efficient glass form can be formed.

As the heat exchange chamber 27 is constructed as described above, it is imparted with an increase in strength against the molding pressure at the time of pressing, compared with one in the shape of a simple cylindrical form.

Furthermore, when the interval of press actions is short, the press surface 212 can be surely cooled to a predetermined temperature.

A lower die 30 comprises a lower die's body 31 in the form of a cylindrical form and a protruded part 34 formed as a protrusion from the upper surface of the lower die's body 31. In addition, the press surface 32 is formed on the upper surface of the lower die's body 31. Molten glass A is mounted on the center of the press surface 32, and the press surface 32 presses the mounted molten glass A, together with the press surface 212 of the upper die 20 (of the first upper die 210). In addition, the upper surface of the protruded part 34 is provided as a smooth surface. The lower die 30 has almost the same diameter as that of the first upper die 210 of the upper die 20 and arranged, almost coaxially arranged on the upper die 20. Furthermore, the press surface 212 of the upper die 20 is brought comes close to the press surface 32 of the lower die 30 and the press surface 212 is then brought into contact with the protruded part 34, so that a gap between the press surface 212 and the press surface 32 can be formed to correspond to the thickness of a glass substrate of a magnetic disk. In the present embodiment, the lower die 30 is fixed. Alternatively, it may be designed so that it can move up and down by a driving device (not shown).

A tube 60 for introducing a heat-exchanging fluid passes through the upper surface of the third upper die 250 in the vertical direction and a terminal end portion 62 of the tube 60 extends to the vicinity of the center 272a of the bottom part 272 of the heat exchange chamber 270. The tube 60 introduces a heat exchanging fluid B into a heat exchange chamber 270. Here, the heat-exchanging fluid B may be always introduced into the heat exchange chamber 270 or properly introduced into the heat exchange chamber 270. For instance, it may be only introduced into the heat exchange chamber 270 at the time of pressing molten glass A.

By applying the above configuration, the tube 60 for introducing a heat-exchanging fluid, which introduces the heat-exchanging fluid B into the heat exchange chamber 270, is provided. In addition, the tube 60 for introducing the heat-exchanging fluid has a terminal end portion that extends to the vicinity of the center of the opposite press surface of the heat exchange chamber. Therefore, for example, when the bottom part 272 absorbs heat transmitted from the press surface 212 for pressing molten glass A and the press surface 212 is then cooled by heat absorption, the heat-exchanging fluid B can be discharged in the vicinity of the center 272a of the bottom part most in need of heat absorption, thereby further accelerating heat absorption in the vicinity of the center 272a of the bottom part 272. In contrast, on the end of the opposite press surface being less in need of heat absorption than the center 272a, the heat-exchanging fluid, which has been once subjected to heat absorption (heat exchange), is circulated, so that the heat can be moderately absorbed. As a result, the whole press surface can be retained at a more preferable temperature for pressing glass, so that a higher-quality, efficient glass form can be formed.

A ratio of the diameter of the tube for introducing the heat-exchange fluid to the diameter of the ceiling art 276, which may be the outermost diameter of the heat exchange chamber 270, is 3:20, preferably in the range of 1:20 to 15:20, further preferably in the range of 1.5:20 to 10:20, most preferably in the range of 2:20 to 6:20. Due to the above numerical imitation, the whole press surface can be retained at a more preferable temperature for pressing glass, so that a higher-quality, efficient glass form can be formed.

In the present embodiment, the heat-exchanging fluid B is water. Here, the reason of using water as the heat-exchanging fluid B is inexpensive and easy to handle. In addition, the heat-exchange fluid B is not only limited to water (including water droplets) but also any of other liquids, gases such as air and non-oxidative nitrogen as well. In particular, the upper die 20 can be efficiently cooled by taking vaporization heat by vaporizing water.

A pump 80 is provided on a passage of the tube 60 for introducing a heat-exchanging fluid. The pump 80 is a part of a feeding device that is responsible for introducing a heat-exchanging fluid B into the heat exchange chamber 270. In other words, the pump 80 introduces the heat-exchanging fluid B to the heat exchange chamber 270 through the tube for introducing the heat-exchange fluid.

The temperature sensor 40 is provided in the vicinity of the first upper die 210. The temperature sensor 40 measures the surrounding part of the first upper die 210 among the upper dies 20. The temperature sensor 40 is of using a thermocouple as a detector (not shown). The temperature sensor 40 is prepared by bringing two kinds of different, thin metal lines into contact with each other in closed circuit to determine temperatures at a measuring junction. Subsequently, the temperature sensor 40 transmits a detection signal to a control circuit 100 by detecting a measured electromotive force, followed by sending a detection signal to the control circuit 100. Here, the temperature sensor 40 may be any of those capable of measuring the temperature of the first upper die 210. For example, the temperature sensor may be one that measures temperatures using variations in electric resistance of metal with temperatures, or one that measures temperatures by assuming the wavelength distribution of heat radiation energy and the strength thereof at each wavelength. In addition, the temperature sensor may be provided on any location as far as it is able measure the temperature of the first upper die 210.

The control circuit 100 is an example of a distribution control device, which comprises CPU, ROM, RAM, and so on (not shown). The control circuit 100 controls the amount of the heat-exchanging fluid B to be fed to the heat exchange chamber 270 on the basis of temperatures of the surrounding part of the first upper die 210 measured by the temperature sensor 40. In other words, on the basis of a detection signal transmitted from the temperature sensor 40, the amount of the heat-exchanging fluid B to be fed to the heat exchange chamber 270 is controlled by controlling the pump 80. Here, the amount of the heat-exchanging fluid B to be fed to the heat exchange chamber 270 may be controlled by hand on the basis of temperatures measured by the temperature sensor 40.

A tube 120 for discharging a heat-exchanging fluid is communicated with the heat exchange chamber 270 on the ceiling part 276 of the heat exchange chamber 270. A heat-exchanging fluid B that has absorbed heat in the heat exchange chamber 270 is discharged from the heat exchange chamber 270 to the outside through the tube 120 for discharging the heat-exchanging fluid.

As configured as described above, the tube 120 for discharging a heat-exchanging fluid B is communicated with a ceiling part 276 provided as an example of the uppermost part directed in the direction of antigravity with respect to the heat exchange chamber 270. Therefore, the heat exchange chamber 270 can be prevented from air-trapping. Therefore, the heat-exchanged heat-exchanging fluid B can be smoothly discharged to the outside. Therefore, the whole press surface can be heated at a more preferable temperature for pressing glass, thereby allowing the formation of a high-quality, efficient glass form.

Method for Forming Glass

Next, using the glass forming apparatus 10 configured as described above, a method for press-forming glass into a glass substrate in the form of a magnetic disk with reference to FIG. 3 and FIG. 4.

At first, in a state that a die is being opened as shown in FIG. 3, a predetermined amount of molten glass is supplied from a supply pipe (not shown). The molten glass being introduced is mounted on the center of the press surface 32 of the lower die 30. A driving device (not shown) is actuated to move the upper die 20 down, thereby allowing the upper die 20 to move to the lower die 30. Then a part of the upper part of the molten glass A is brought into contact with the center of the press surface 212 of the upper die 20, so that the upper end of the surface of the molten glass A can be partially pressed.

Subsequently, the upper die 20 is abutted (close contact) to the protruded part 34 of the lower die 30. Then, the molten glass A can be pressurized on the upper die 20 and the lower die 30, so that the molten glass A can be extended concentrically. Thus, the molten glass A can be tightly introduced into a space surrounded by the press surface 212 of the upper die 20 and the press surface 32 of the lower die 30 without clearance, while the molten glass is in a state of being formed into a disk shape.

Next, a glass substrate of a magnetic disk thus formed is removed from the die and then transferred to a subsequent processing steps. Then, the above steps are repeatedly carried out to continuously repeat the steps for press-forming a disk-shaped glass form.

Furthermore, in the present invention, the apparatus and method for manufacturing a glass substrate in the form of a magnetic disk were described. The glass forming apparatus and method of the present invention can be used for press-forming of thin glass plate products and thick glass plate products, such as biconvex lenses and biconcave lenses, in addition to those in the form of a magnetic disk. In addition, the glass forming apparatus can be used for forming a quadrangular lens by making structural components, such as members of the glass forming apparatus 10 including an upper die 20 and a lower die 30 into a quadratic prism form.

Furthermore, in the present invention, molten glass A is mounted on the low die 30, and then press-formed by the upper die 20. Furthermore, the solidified glass mass (e.g., glass gob) may be dissolved in a melting device equipped in the low die 30, followed by carrying out press-forming with the upper die 20. In other words, a direct press method and a repeat press method can be applied.

In the case of the repeat press method, that is, when a solidified glass mass was mounted on the press surface 32 and then dissolved in the lower die 30, followed by press-forming with the upper die 20, in the heat exchange chamber, a high-temperature fluid may be circulated as a heat-exchanging fluid in any of the upper die 20 or the lower die 30.

In the present invention, materials for the first upper die 210, the second upper die 230, the third upper die 250, and the lower die 30 may be those having lower thermal conductivities, such as graphite, tungsten alloy, nitride, carbide, and refractory metals, which may be suitably selected in consideration of the qualifications of glass to be pressed. In addition, each of the first upper die 210, the second upper die 230, the third upper die 250, and the lower die 30 can be heated up to their respective temperatures or may be retained by electric or gas heating. Similarly, materials for the tube 60 for introducing a heat-exchange fluid and the tube 120 for discharging a heat-exchanging fluid may be suitably selected from heat-resistant alloys, metals excellent in oxidation resistance, and so on.

Furthermore, in the present embodiment, the glass forming apparatus and method, where only the upper die is cooled, have been described. Alternatively, it may be provided as a glass-forming apparatus where both the upper and lower dies are cooled. Alternatively, it may be provided as a glass-forming apparatus in which only the lower die can be cooled.

Second Embodiment

Next, a preferable second embodiment of the present invention will be described with reference to the drawings.

Here, in the following embodiment, the same structural elements as those of the first embodiment will be given the same reference numerals and the descriptions thereof may be omitted or simplified.

Figure 5:
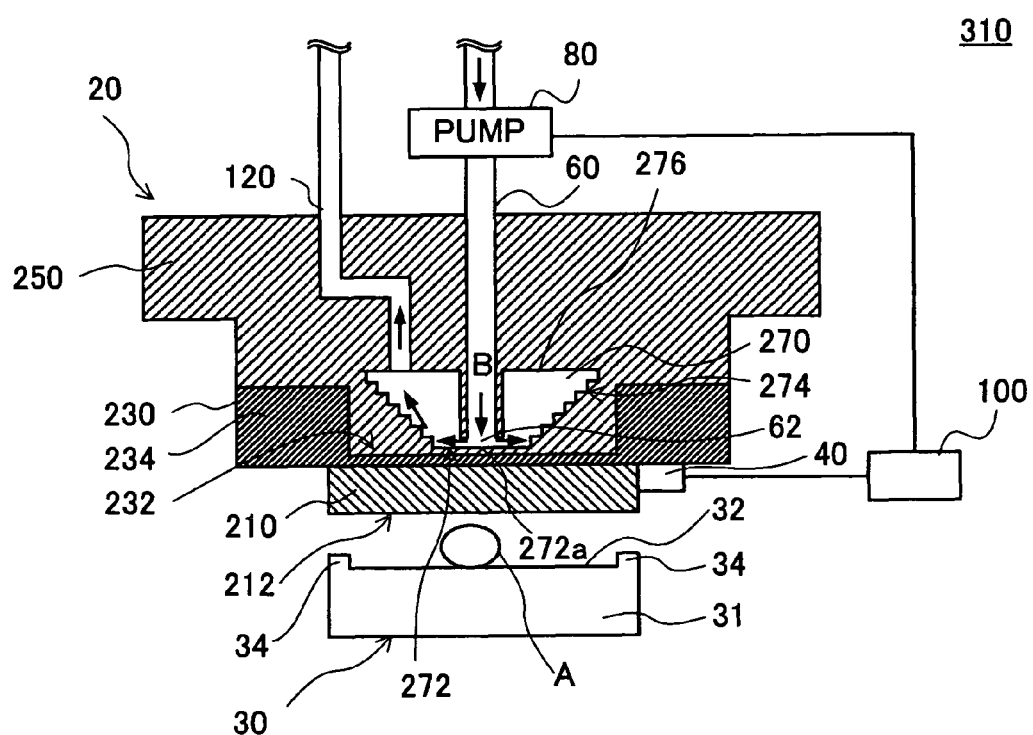
FIG. 5 is an exploded view of the schematic configuration of the glass forming apparatus in accordance with the second embodiment of the present invention.

FIG. 5 shows a preferable example of the second embodiment of the present invention, and a partial cross sectional front view of the schematic configuration of a glass forming apparatus. The configuration of a glass forming apparatus 310 of the second embodiment is different from that of the glass forming apparatus 10 of the first embodiment in that an upper die 20 of the glass forming apparatus 310 is constructed such that the wall thickness of an opposite press surface decreases from the outside to the inside in a plural stepwise manner.

Third Embodiment

Next, a preferable third embodiment of the present invention will be described with reference to the drawings.

Figure 6:
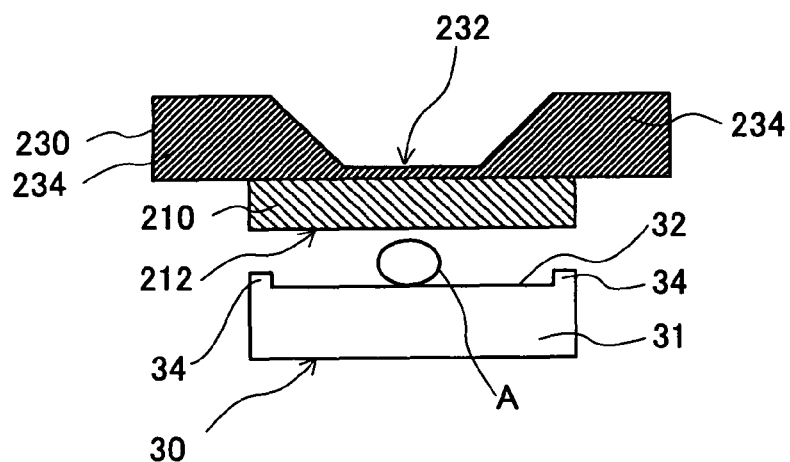
FIG. 6 is an exploded view of the schematic configuration of the glass forming apparatus in accordance with the third embodiment of the present invention.

FIG. 6 shows a preferable example of the third embodiment of the present invention, and a partial cross sectional front view of the schematic configuration of a glass forming apparatus. The configuration of a glass forming apparatus 410 of the third embodiment is different from that of the glass forming apparatus 10 of the first embodiment in that the glass forming apparatus does not contain a third upper die 250 (in which a heat exchange chamber 250 is formed), a temperature sensor 40, a tube 60 for introducing a heat-exchanging fluid, a pump 80, a control circuit 100, and a tube 120 for discharging a heat-exchanging fluid, and also a protruded part 234 provided as an example of the opposite press surface of the second upper die 230 is constructed such that the wall thickness of the protruded part 234 gradually decreases from the outside to the inside. In the present embodiment, alternatively, the glass forming apparatus 410 may be constructed such that the wall thickness of a protruded part 234 decreases from the outside to the inside in a plural stepwise manner.

Here, the present invention is not restricted by the embodiments described above. Any variations, modifications and so on are within the scope of the present invention as long as the object of the present invention can be attained.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. An apparatus for forming a glass substrate for an information recording medium, the apparatus comprising:
   a first die having a mounting surface for mounting molten glass; and
   a second die having a flat press surface for pressing glass so as to face the mounting surface, wherein
   the second die includes: a heat exchange chamber, a part of the inner wall of the heat exchange chamber being an opposite press surface for cooling the press surface; and a heat-exchanging-fluid-introducing tube that introduces a heat-exchanging fluid for exchanging heat with a part that surrounds the heat exchange chamber, the tube connecting an outside of the apparatus for forming a glass substrate to a substantial center of the opposite press surface, and
   the second die is constructed such that a wall thickness of the opposite press surface decreases continuously or stepwisely from an outside of the opposite press surface to an inside of the opposite press surface, in a direction perpendicular to the press surface.

2. An apparatus for forming a glass substrate for an information recording medium according to claim 1, wherein
   the heat exchange chamber is in the form of approximately a circular truncated cone shape or a cone shape.

3. An apparatus for forming a glass substrate for an information recording medium according to claim 1, wherein
   the heat-exchanging-fluid-introducing tube has a terminal end portion that extends to the vicinity of the center of the opposite press surface of the heat exchange chamber.

4. An apparatus for forming a glass substrate for an information recording medium according to claim 3,
   wherein a ratio of the diameter of the heat-exchanging-fluid-introducing tube to the outermost diameter of the heat exchange chamber is in the range of 1:20 to 15:20.

5. An apparatus for forming a glass substrate for an information recording medium according to claim 3, wherein the glass forming apparatus is capable of discharging the heat-exchanging fluid directly from the heat-exchanging-fluid-introducing tube, to the opposite press surface.

6. An apparatus for forming a glass substrate for an information recording medium according to claim 1, further comprising:
   a feeding device for feeding the heat-exchanging fluid to the heat exchange chamber;
   a distribution-control device for controlling the feeding device; and
   a temperature-measuring sensor for measuring the temperature of the surrounding part of the press surface, wherein
   the distribution-control device controls the amount of the heat-exchanging fluid to be fed to the heat exchange chamber on the basis of a temperature of the surrounding part of the press surface measured by the temperature-measuring sensor.

7. An apparatus for forming a glass substrate for an information recording medium according to claim 1, further comprising:
   a tube for discharging a heat-exchanging fluid, which discharges the heat-exchanging fluid from the heat exchange chamber to the outside, wherein
   the tube for discharging a heat-exchanging fluid communicates with an uppermost part in the direction of anti-gravity with respect to the heat exchange chamber.

8. An apparatus for forming a glass substrate for an information recording medium according to claim 1, wherein the heat-exchanging fluid is water.

9. An apparatus for forming a glass substrate for an information recording medium according to claim 1, wherein an area of a portion of the opposite press surface, having the smallest wall thickness in the second die, in a direction perpendicular to the press surface, is smaller than an area of the press surface.

10. An apparatus for forming a glass substrate for an information recording medium according to claim 9, wherein a portion in the second die having the smallest wall thickness comprises an opposite side of a center portion of the press surface.

11. An apparatus for forming a glass substrate for an information recording medium according to claim 1, wherein the heat exchange chamber is formed nearer to the opposite press surface than to the press surface of the second die.

12. A glass forming method using a glass forming apparatus for forming a glass substrate for an information recording medium comprising: a first die having a mounting surface for mounting molten glass; and a second die having a flat press surface for pressing glass so as to face the mounting surface, wherein the second die includes: a heat exchange chamber, a part of the inner wall of the heat exchange chamber being an opposite press surface for cooling the press surface; and a heat-exchanging-fluid-introducing tube that introduces a heat-exchanging fluid for exchanging heat with a part that surrounds the heat exchange chamber, the tube connecting an outside of the apparatus for forming a glass substrate to a substantial center of the opposite press surface, and the second die is constructed such that a wall thickness of the opposite press surface decreases continuously or stepwisely from an outside of the opposite press surface to an inside of the opposite press surface, in a direction perpendicular to the press surface,
   the method comprising the steps of:
   mounting molten glass on the mounting surface; and
   pressing the molten glass by bringing the first die into close contact with the second die.

* * * * *